United States Patent Office 3,053,855
Patented Sept. 11, 1962

3,053,855
SYNTHESIS OF GLYCIDYL ESTERS
Gerhard Maerker, Philadelphia, and William S. Port, Norristown, Pa., assignors to the United States of America as represented by the Secretary of Agriculture
No Drawing. Filed Feb. 24, 1960, Ser. No. 10,813
7 Claims. (Cl. 260—348)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for preparing glycidyl esters.

In current procedures for preparing glycidyl esters of carboxylic acids by the reaction of carboxylic acids or their salts with epichlorohydrin, it is generally agreed that successful formation of the epoxy compound is dependent upon operating under essentially anhydrous conditions. However, all previously disclosed reactions, either hydrous or anhydrous, in which carboxylic acids are the starting materials, give low yields and result in products which are difficult to purify. In the experience of past workers such as Kester et al., (J. Organic Chem., vol. 8, p. 550 (1943) and patent U.S. 2,448,602) extreme precautions to exclude traces of moisture are necessary to obtain purifiable materials from the reaction of an alkali metal salt of a monocarboxylic acid and epichlorohydrin. This procedure was found to be inapplicable to salts of aliphatic dicarboxylic acids. When no effort is made to exclude moisture, the reaction of alkali metal salts of mono- or di-carboxylic acids with epichlorohydrin resulss in products of low oxirane content and in materials from which the desired compounds are obtainable only in very low yield. As U.S. 2,893,875 discloses, in the presence of considerable amounts of water and an excess of available alkali metal ions, the product obtained does not contain an epoxy group.

High yields of glycidyl esters of certain mono- and poly-carboxylic acids are prepared in the process of the present invention from an aqueous system, particularly that aqueous system obtained by combining an aqueous solution of an alkali metal salt of the carboxylic acid with an excess of epichlorohydrin and a small amount of a quaternary ammonium halide as the catalyst. The ability of the reaction to proceed in the presence of water has in many cases significant advantages over the anhydrous systems. Many alkali metal carboxylates, especially those of many dicarboxylic acids, have very low solubility in boiling epichlorohydrin. The anhydrous method proceeds slowly and gives rises, as a result, to extensive formation of difficulty removable by-products. Alkali metal carboxylates are soluble in the water-epichlorohydrin mixture and undergo reaction readily in the presence of the quaternary ammonium halide. Yields and purities of the products are increased substantially.

In general according to the present invention glycidyl esters are prepared by heating, preferably by refluxing at atmospheric pressure, a reaction mixture of a 10 to 20 molar excess of epichlorohydrin and an aqueous solution of an alkali metal salt of the organic carboxylic acid, particularly the potassium or sodium salt of a mono- or poly-carboxylic acid, in the presence of a quaternary ammonium halide until substantially all the salt has reacted, and separating the glycidyl ester from the reaction mixture.

The quaternary ammonium halide whch serves as a catalyst in the present process may be a tetraalkylammonium halide, most conveniently one in which the alkyl groups are short chain aliphatic radicals, such as in tetraethylammonium bromide and tetrabutylammonium chloride, or the catalyst may be an arylalkylammonium halide such as benzyltrimethylammonium chloride. While about 1 to 2% by weight of the quaternary ammonium halide is used in the examples, considerably smaller or larger amounts can be used successfully in this process.

The aqueous solution of the carboxylic acid salt may be prepared by dissolving a previously prepared salt in water, with heating if desired, or by combining an aqueous solution of the alkali metal hydroxide with the stoichiometrically equivalent amount of the carboxylic acid and heating, if desired.

The carboxylic acid salts may be derived from any organic carboxylic acid. The carboxylic acid may be aliphatic, cycloaliphatic, aromatic or heterocyclic and may be saturated or unsaturated. Preferred salts are the salts of acids containing not more than 18 carbon atoms per carboxylic acid radical, such as the salts of acrylic acid, polyacrylic acid, stearic acid, pelargonic acid, azelaic acid, sebacic acid, adipic acid, succinic acid, phthalic acid, oleic acid, dimerized linoleic acid and trimerized linoleic acid.

The materials participating in the reaction may be combined in several ways to achieve excellent yields of glycidyl ester provided that a reaction temperature of at least about 80° C. is reached within about two hours after combination of the materials. For example, epichlorohydrin and an aqueous solution of the carboxylic acid salt may be combined, heated to boiling, and the reaction carried out by the addition of the catalyst to the refluxing mixture. Alternatively, an aqueous solution of the carboxylic acid salt and the catalyst may be added slowly to refluxing epichlorohydrin.

The preferred procedure is a modification of the latter sequence in which the reaction mixture is refluxed (90 to 120° C.) in a vessel equipped for distillation, and the water with epichlorohydrin is gradually and continuously removed from the mixture by distillation at atmospheric pressure while the reaction continues. The distillate is condensed by cooling, and the epichlorohydrin portion separated from the condensate is returned to the reaction mixture. After the addition of the aqueous solution of the salt is complete, distillation of water from the reaction mixture is continued until the bulk of the water has been removed. The reaction mixture is then cooled and is either filtered or washed with water. The crude glycidyl ester product is then obtained by crystallization from the reaction mixture or by distillative removal of excess epichlorohydrin under reduced pressure.

The glycidyl esters are separated from the crude product by solvent extraction or by other standard methods. One method in general which has been found to be particularly useful in aiding in the purification of some of the glycidyl esters is the treatment of the crude product dissolved in an inert organic solvent of low polarity, such as benzene or hexane, with a commercial grade of magnesium silicate, a commercially available form of which is "Florisil", and removal of the magnesium silicate and adsorbed impurities. The crude products may contain impurities which consist mainly of the chlorohydrin esters, that is, compounds which might result from the reaction of glycidyl esters with hydrogen chloride. Such chlorohydrin esters may be separated from the desired product and dehydrohalogenated by known methods to give additional quantities of the desired product.

The process of the present invention is particularly well suited for the formation of glycidyl esters of carboxylic acids whose alkali metal salts have low solubility in boiling epichlorohydrin, but have modest to considerable solubility in a hot mixture of water and epichlorhydrin.

The following examples illustrate the application of the present invention.

*Example 1.—Preparation of Diglycidyl Azelate*

To a refluxing solution of 11.5 g. of benzyltrimethylammonium chloride in 400 g. of epichlorohydrin was added dropwise a hot (80–90° C.) solution of 69.6 g. of disodium azelate in 140 ml. of water. Concurrently with this addition, water so added to the reaction mixture was removed as the codistillate with epichlorohydrin, and after cooling of the codistillate, the water was isolated by phase separation and the epichlorohydrin returned to the reaction flask. After completion of the addition of aqueous disodium azelate (about 35 minutes), codistillation of water and epichlorohydrin was continued to remove the bulk of the remaining water (about 15 minutes).

The reaction mixture was cooled and then was agitated thoroughly with two portions of water. After phase separation, residual water and free epichlorohydrin were removed from the organic phase by distillation at reduced pressure. Final traces of epichlorohydrin were removed by addition of toluene followed by distillation at reduced pressure (final pot temperature 80° C. at 6 mm. Hg) to obtain crude diglycidyl azelate (90.8 g.; $n_D^{35.5}$=1.4613, Sap. No. 409; oxirane oxygen: 8.13%).

79.0 g. of crude product were dissolved in 500 ml. of a mixture of equal volumes of benzene and ligroin (B.P. 63–70° C.) 8.0 g. of 200 mesh Florisil was added, the mixture was agitated intermittently for one hour and then filtered. The solvent was removed from the filtrate by distillation first at atmospheric pressure and finally under reduced pressure (final pot temperature 65° C. at 2 mm.) to obtain partly purified diglycidyl azelate (71.1 g.; $n_D^{35.5}$=1.4610; oxirane oxygen: 8.39%).

18.6 g. of the partly purified product was recrystallized twice from aqueous methanol at −25° C. to obtain essentially pure diglycidyl azelate (7.1 g.; $n_D^{35.5}$=1.4573; Sap. No. 376; oxirane oxygen: 10.25%).

*Example 2.—Preparation of Diglycidyl Sebacate*

To a suspension of 60.7 g. sebacic acid in 100 ml. water was added 33.3 g. potassium hydroxide in 100 ml. water and the mixture heated to obtain a clear solution. To 400 g. of epichlorohydrin at reflux was added dropwise a hot (80–90° C.) solution containing 11.6 g. of benzyltrimethylammonium chloride in 17 ml. of water and 25 ml. of dipotassium sebacate. This was followed by dropwise addition of the remaining hot (80–90° C.) dipotassium sebacate solution. Addition of the aqueous solutions was accompanied, as described in Example 1, by simultaneous distillative removal of water and after completion (44 minutes) was followed by further water and epichlorohydrin codistillation (26 minutes). Water washing and reduced pressure stripping of the reaction mixture, both carried out as in Example 1, gave crude diglycidyl sebacate (104.2 g.; Sap. No. 408; oxirane oxygen: 7.22%).

10.0 g. of the crude product was heated with 400 ml. ligroin (B.P. 88–98° C.), the clear ligroin extract decanted from undissolved oil, cooled to 40° C. and again decanted and finally cooled to −20° C. Filtration and air drying gave diglycidyl sebacate (4.4 g.; Sap. No. 369; oxirane oxygen: 9.44%; M.P. 42.8–43.5° C.).

*Example 3.—Preparation of Diglycidyl Sebacate*

To 400 g. of epichlorohydrin at reflux was added a hot solution (approximately 80–90° C.) of 74.5 g. disodium sebacate and 12.6 g. tetraethylammonium bromide in 330 ml. water, as described in Example 1, with simultaneous removal of added water by codistillation with epichlorohydrin. Addition time was 48 minutes, and removal of the bulk of the water required a further 60 minutes. The reaction mixture, after being cooled, was washed with water and excess epichlorohydrin was removed by distillation at low pressure as described in Example 1. The crude diglycidyl sebacate obtained (112.9 g.; $n_D^{35.5}$: 1.4664; Sap. No. 416; oxirane oxygen: 5.95%) could be further purified by standard methods.

*Example 4.—Preparation of Glycidyl Pelargonate*

To 400 g. of epichlorohydrin at reflux was added dropwise a hot solution (approximately 80–90° C.) of 47.5 g. pelargonic acid, 17.6 g. potassium hydroxide and 9.6 g. benzyltrimethylammonium chloride in 177 ml. water, as described in Example 2, with simultaneous removal of water by codistillation with epichlorohydrin as in Example 1. The aqueous solution was added over a period of 57 minutes and the distillative removal of water continued for a further 13 minutes.

The reaction mixture was washed with water and the epichlorohydrin was removed at reduced pressure as in Example 1. The crude glycidyl pelargonate thus obtained was a yellow oil (72.1 g.; $n_D^{35.5}$: 1.4390; Sap. No. 315, oxirane oxygen: 6.18%).

*Example 5.—Preparation of Diglycidyl Phthalate*

To 400 g. of boiling epichlorohydrin was added a hot solution (approximately 80–90° C.) of 44.4 g. phthalic anhydride, 33.3 g. potassium hydroxide and 11.6 g. benzyltrimethylammonium chloride in 157 ml. water, as described in Example 2, with simultaneous removal of added water by codistillation with epichlorohydrin as described in Example 1. Addition of the aqueous solution (47 minutes) and distillation of the bulk of the remaining water (20 minutes) was followed by water washing and reduced pressure stripping as described for Example 1. The crude diglycidyl phthalate was obtained as a yellow oil (91.6 g.; $n_D^{35.5}$: 1.5231; Sap. No.: 450, oxirane oxygen: 7.85%).

*Example 6.—Preparation of Diglycidyl Azelate*

To 200 g. of epichlorohydrin at 80° C. was added a hot (80–90° C.) solution of 34.8 g. disodium azelate in 60 ml. of water. The mixture was heated to 90° C. and 5.8 g. of benzyltrimethylammonium chloride in 15 ml. water was added. The resulting reaction mixture was heated under total reflux for thirty minutes and then cooled. Water washing and reduced pressure stripping was then carried out as described for Example 1. The crude diglycidyl azelate was obtained as a faintly yellow oil (47.1 g.; $n_D^{35.5}$: 1.4643; oxirane oxygen: 6.95%.

We claim:

1. A process comprising heating a reaction mixture of a 10 to 20 molar excess of epichlorohydrin and an aqueous solution of an alkali metal salt of a carboxylic acid selected from the group consisting of acrylic acid, polyacrylic acid, stearic acid, pelagonic acid, azelaic acid, sebacic acid, adipic acid, succinic acid, phthalic acid, oleic acid, dimerized linoleic acid, and trimerized linoleic acid in the presence of a quaternary ammonium halide, to produce the glycidyl ester of said carboxylic acid.

2. A process comprising refluxing a reaction mixture of a 10 to 20 molar excess of epichlorohydrin and an aqueous solution of an alkali metal salt of a carboxylic acid selected from the group consisting of acrylic acid, polyacrylic acid, stearic acid, pelagonic acid, azelaic acid, sebacic acid, adipic acid, succinic acid, phthalic acid, oleic acid, dimerized linoleic acid, and trimerized linoleic acid in the presence of a quaternary ammonium halide, to produce the glycidyl ester of said carboxylic acid, the while distilling from the reaction mixture epichlorohydrin and water, condensing the distillate, separating epichlorohydrin from the condensate, and returning the separated epichlorohydrin to the reaction mixture, until the reaction mixture becomes substantially anhydrous.

3. The process of claim 2 in which the anhydrous reaction mixture is dissolved in an inert organic solvent of low polarity, about 1 to 20% of magnesium silicate is added to the solution, the resulting mixture is stirred for at least one hour, and is filtered to remove magnesium silicate and adsorbed impurities, and the solvent is removed from the filtrate to give a purified glycidyl ester of a carboxylic acid.

4. The process of claim 1 in which the carboxylic acid is phthalic acid.

5. The process of claim 1 in which the carboxylic acid is sebacic acid.

6. The process of claim 1 in which the carboxylic acid is azelaic acid.

7. The process of claim 1 in which the carboxylic acid is pelargonic acid.

References Cited in the file of this patent

UNITED STATES PATENTS

| | | |
|---|---|---|
| 2,252,039 | Schirm | Aug. 12, 1942 |
| 2,537,981 | Edwards | Jan. 16, 1951 |
| 2,781,333 | Updegraff | Feb. 12, 1957 |
| 2,801,232 | Suen et al. | July 30, 1957 |
| 2,939,879 | De Benedictis | June 7, 1960 |

OTHER REFERENCES

Kester et al.: Jour. Org. Chem., vol. 8, pp. 550–556 (1943).

The Condensed Chemical Dictionary, Reinhold Publishing Corp., New York, 1956 (page 676 relied on).